United States Patent
Maharaja

(10) Patent No.: US 9,840,341 B2
(45) Date of Patent: Dec. 12, 2017

(54) IP-BASED SATELLITE COMMAND, CONTROL, AND DATA TRANSFER

(71) Applicant: Rishabh Y. Maharaja, Reisterstown, MD (US)

(72) Inventor: Rishabh Y. Maharaja, Reisterstown, MD (US)

(*) Notice: Subject to any disclaimer, the term of this patent is extended or adjusted under 35 U.S.C. 154(b) by 54 days.

(21) Appl. No.: 15/148,761

(22) Filed: May 6, 2016

(65) Prior Publication Data

US 2016/0344685 A1 Nov. 24, 2016

Related U.S. Application Data

(60) Provisional application No. 62/158,971, filed on May 8, 2015.

(51) Int. Cl.
  *B64G 1/36* (2006.01)
  *B64G 1/24* (2006.01)
  *H04W 4/00* (2009.01)
  *H04L 12/40* (2006.01)
  *H04B 1/38* (2015.01)

(52) U.S. Cl.
  CPC .......... *B64G 1/242* (2013.01); *H04B 1/38* (2013.01); *H04L 12/40* (2013.01); *H04W 4/008* (2013.01); *B64G 2001/245* (2013.01)

(58) Field of Classification Search
  USPC .......................................................... 701/13
  See application file for complete search history.

(56) References Cited

U.S. PATENT DOCUMENTS

| | | | |
|---|---|---|---|
| 6,160,797 A | 12/2000 | Robert, III et al. | |
| 6,415,329 B1 | 7/2002 | Gelman et al. | |
| 6,674,731 B1 | 1/2004 | Bradshaw et al. | |
| 7,502,382 B1 | 3/2009 | Liu et al. | |
| 8,432,808 B1* | 4/2013 | Dankberg | H04L 67/325 370/235 |
| 8,634,765 B2 | 1/2014 | Plamondon | |
| 8,843,059 B2* | 9/2014 | Roos | H04B 7/18528 370/310 |

(Continued)

OTHER PUBLICATIONS

Eylem Ekici, A Multicast Routing Algorithm for LEO Satellite IP Networks, IEEE (Apr. 2002).

(Continued)

*Primary Examiner* — Tyler Paige
(74) *Attorney, Agent, or Firm* — Baker Donelson, PC; Royal W. Craig

(57) ABSTRACT

A method and system for satellite control in space using an IP-based satellite bus and all-IP compliant subsystems and payload(s) and a corresponding T&C system. Specifically, the present method/system includes a satellite-based IP Bus (connected as a network) that relies on Ethernet, USB, WIFI, or Bluetooth to connect various satellite components, satellite components configured to communicate on the IP bus, and a T&C system that understands the IP bus and can read its telemetry and commands. The system permits operations control on-orbit, in near real time within a secure system environment, with a dramatic increase in mission efficiency, an expansion of how much and what can be done on-orbit, and cost savings on future missions using IP-compliant spacecraft and payloads.

25 Claims, 12 Drawing Sheets

(56) References Cited

U.S. PATENT DOCUMENTS

| | | | |
|---|---|---|---|
| 2005/0027910 A1* | 2/2005 | Barrett, Jr. | G06F 13/4022 710/62 |
| 2006/0100846 A1* | 5/2006 | Lee | B64G 7/00 703/22 |
| 2007/0168655 A1* | 7/2007 | Thomasson | H04L 63/0428 713/151 |
| 2008/0092180 A1* | 4/2008 | Kim | H04B 7/18519 725/63 |
| 2011/0092158 A1* | 4/2011 | Plamondon | H04B 7/18532 455/41.2 |
| 2011/0116441 A1* | 5/2011 | Wyler | H04B 7/18584 370/316 |
| 2012/0127922 A1* | 5/2012 | Feher | H04W 64/00 370/320 |
| 2014/0380433 A1* | 12/2014 | Yerger | H04L 63/107 726/4 |
| 2015/0131703 A1* | 5/2015 | Balter | H04B 1/715 375/133 |
| 2016/0344685 A1* | 11/2016 | Maharaja | H04W 4/008 |
| 2017/0041064 A1* | 2/2017 | Curtis | H04W 4/046 |
| 2017/0163334 A1* | 6/2017 | Haziza | H04B 7/185 |

OTHER PUBLICATIONS

L. Wood et al., IP routing issues in satellite constellation networks, Int. J. Satell. Commun., 19: 69:92 (2001).

Sellers et al., "Understanding Space: An Introduction to Astronautics", McGraw-Hill Create (2005) ISBN 10: 0073407755).

Richard A. Slywczak, "Conceptual Design of an IP-based Satellite Bus Using Internet Technologies"; 17th Annual AIAA/USU Conference on Small Satellites; 2004.

* cited by examiner

Note: each substem is a computer with its own CPU and assigned IP address

IP-BASED SATELLITE COMMAND, CONTROL, AND DATA TRANSFER

CROSS-REFERENCE TO RELATED APPLICATION(S)

The present application derives priority from U.S. Provisional Patent Application 62/158,971 filed 8 May 2015.

BACKGROUND OF THE INVENTION

1. Field of the Invention

The present invention relates to a method for satellite communications and, more particularly, to a satellite bus, its corresponding satellite subsystems, and a T&C that communicate by IP protocol.

2. Description of the Background

Satellites are proliferating for communication, surveillance, meteorology, navigation, etc. In each case a ground control system is needed for monitoring and controlling the satellite and its various payloads. The payloads are connected to a satellite bus, and commands are sent to the payloads via the satellite bus. For more information on the basics of satellite subsystems refer to Sellers et al., "Understanding Space: An Introduction to Astronautics", McGraw-Hill Create (2005) ISBN 10: 0073407755).

Telemetry and science data downlinked from a satellite is typically transmitted to the mission operations center (MOC) and to its users and operators via ground stations and/or relay satellites. A telemetry and commanding system (T&C) is used at the MOC so that the satellite operator can send commands to the satellite, and view telemetry sent by the satellite. Commands sent by the satellite operator travel from the MOC to the ground station, and from the ground station to the relay satellite, and from the relay satellite to the actual satellite being commanded. Telemetry follows the reverse order, where the actual satellite will send telemetry and that telemetry is received by the ground station or the relay satellite and its ground station before reaching the MOC and the T&C. The operator would use the T&C system to monitor the state of health and operating limits of the various satellite subsystems and payloads. Aboard the satellite the following are the typical systems that are connected to and communicate over the satellite bus:

Electric power/distribution subsystem (EPS or EPDS): the hard- and software used to generate and distribute electrical power to the spacecraft, including solar arrays, batteries, solar-array controllers, power converters, electrical harnesses, battery-charge-control electronics, and other components;

Communication and Data Handing (C&DH): The electronics onboard a satellite that allow the satellite to receive commands from the user/operator and to send telemetry to the user/operator. The communication subsystem would consist of equipment such as: transmitters and receivers, transceivers, and antennas. The data handling electronics distribute and or store the necessary data.

Attitude/orbit control subsystem (AOCS): The devices used to sense and control the vehicle attitude and orbit. Typical components of the AOCS system include sun and Earth sensors, star sensors (if high-precision pointing is required), reaction or momentum wheels, Inertial Measurement Units (IMUs), Inertial Reference Units (IRUs), and the electronics required to process signals from the above devices and control satellite attitude;

Propulsion subsystem: Liquid and solid rockets or compressed-gas jets and associated hardware used for changing satellite attitude, velocity, orbit, or spin rate. Solid rockets are usually used for placing a satellite in its final orbit after separation from the launch vehicle. The liquid engines (along with associated plumbing lines, valves, and tanks) may be used for attitude control and orbit adjustments as well as final orbit insertion after launch;

Thermal-control subsystem (TCS): The hardware used to control temperatures of all vehicle components. Typical TCS elements include surface finishes, insulation blankets, heaters, and cryogenic coolers.

Each satellite is designed around its payload, and each of the subsystems mentioned above help the payload complete its mission. The satellite bus or spacecraft bus is the general model on which multiple-production satellite spacecraft are built, and each satellite manufacturer typically provides a proprietary bus architecture.

Each of the subsystems mentioned above communicate over the satellite bus using prescribed data communications protocols. Traditionally proprietary protocols were used or variations on Asynchronous Transfer Mode (ATM). However, in the past decade satellite manufacturers have begun to embrace standardized protocols, allowing users to interact with standard computer PCs.

TCP/IP based network protocols are widely used today for various applications, such as turning a car on from your mobile device, commanding home security systems from your home device, and many more. TCP/IP is a set of protocols that allows anyone with a computer, modem, and an Internet service provider to access and share information over the Internet. TCP/IP enables cross-platform, or heterogeneous, networking. For example, a Windows NT/2000 network could contain Unix and Macintosh workstations or even networks mixed in it. TCP/IP also has the following advantages: 1) good failure recovery; 2) the ability to add networks without interrupting existing services; 3) high error-rate handling; 4) platform independence; and 5) low data overhead.

TCP/IP-based networking protocols can conceivably be used to command and control satellites and to allow for data transfer to and from satellites. However, TCP/IP does not perform well in networks having a large bandwidth-delay such as satellite links, and so it has not been very widely used by most of today satellite manufacturers. Another problem with TCP/IP is its weakness to recover from frequent losses in a wireless environment. In an IP network the sender sets a certain window for transmission of packets, and will cut back its window size if it encounters congestion. Any packet loss is a congestion indication and consequently it cuts back the window. Due to the high bit error rate in satellite links, such behavior is seen as congestion, which leads to a significant deterioration in TCP/IP throughput.

What is needed, is an IP-based satellite bus and method for satellite control in space. This would permit operations control on-orbit, in near real time within a secure system environment, with a dramatic increase in mission efficiency, an expansion of how much and what can be done on-orbit, and cost savings on future missions using TCP/IP-compliant spacecraft and payloads. The transport layer is part of the layered architecture of protocols in the network stack in the Internet Protocol Suite, and these protocols of the transport layer provide host-to-host communication services for applications. See, Maharaja, Rishabh, "Satellite Commanding, Controlling, and Data Transfer Concept using TCP/IP—From Classroom to Application" (2015)

SUMMARY OF THE INVENTION

Accordingly, it is an object of the invention to provide a computerized system and method for IP-based satellite control in space. The present invention does this with a method for satellite control in space using an IP-based satellite bus and all-IP compliant subsystems and payload(s) and a corresponding T&C system. Specifically, the present system includes the following:

1. An IP Bus (connected as a network) that relies on Ethernet, USB, WIFI, or Bluetooth to connect various satellite components;
2. Satellite components configured to communicate on the IP bus; and
3. A T&C system that understands the IP bus and can read its telemetry and commands.

The system permits operations control on-orbit, in near real time within a secure system environment, with a dramatic increase in mission efficiency, an expansion of how much and what can be done on-orbit, and cost savings on future missions using IP-compliant spacecraft and payloads.

For a more complete understanding of the invention, its objects and advantages refer to the remaining specification and to the accompanying drawings.

BRIEF DESCRIPTION OF THE DRAWINGS

Other objects, features, and advantages of the present invention will become more Apparent from the following detailed description of the preferred embodiment and certain modifications thereof, in which.

DETAILED DESCRIPTION OF THE PREFERRED EMBODIMENTS

The present invention is a computerized system and method for IP-based satellite control in space, inclusive of the satellite bus architecture, ground control system architecture, and distributed software modules on both ends.

Figure 1:
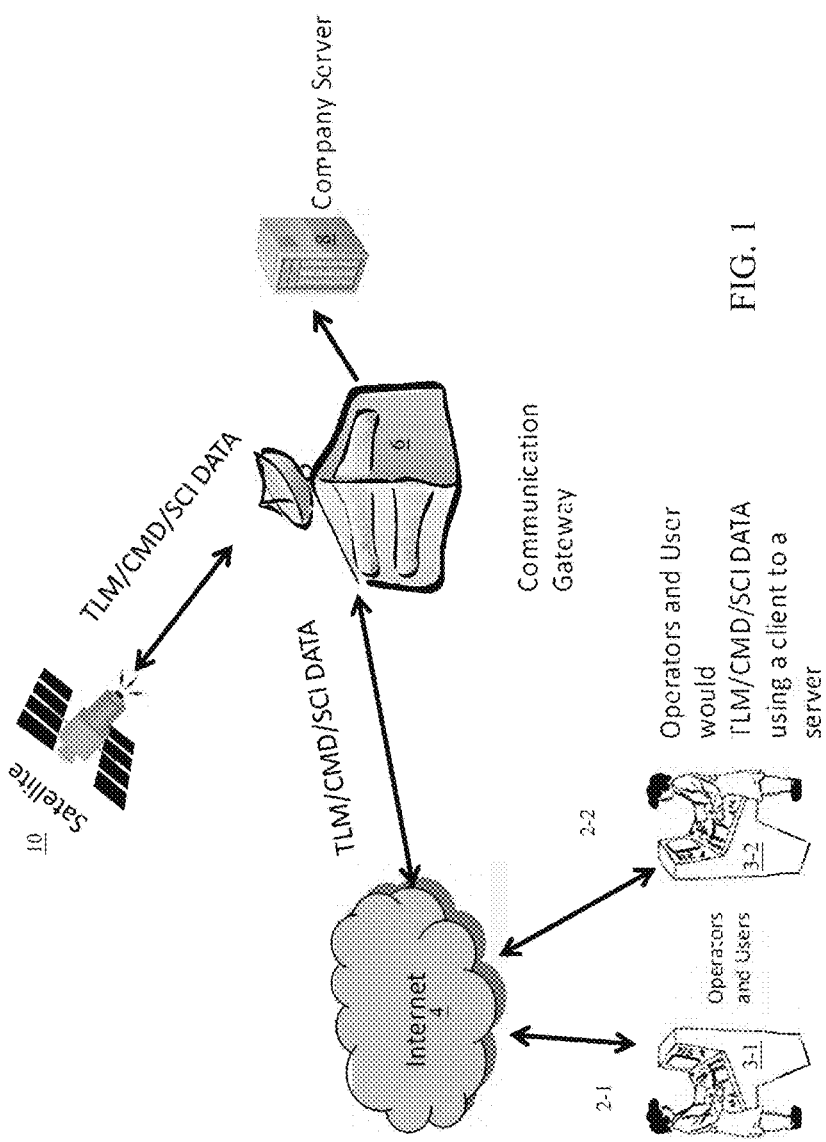
FIG. 1 shows an embodiment of an IP based network for a non-relay satellite communications network.

The following abbreviations are used throughout this application:
AOCS Attitude and Orbit Control Subsystem
C&DH Communication and Data Handling
CMD Command
COMM Communications
CPU Central Processing Unit
DSS Data Storage Subsystem
EPS Electric Power Distribution System
FTP File Transfer Protocol
HDD Hard Drive Device
HTTP Hypertext Transfer Protocol
IM Instant Messenger
IP Internet Protocol
MOC Mission Operations Center
　USER/OPERATOR User at MOC
n.d. No Date
PCI Peripheral Component Interface
RAM Random Access Memory
RTG Radio Isotope Thermoelectric Generator
SCI Science
SD Secure Digital
SMTP Simple Mail Transfer Protocol
TCP Transmission Control Protocol
TDRS Tracking and Data Relay Satellite
TLM Telemetry
T&C Telemetry and Command
UDP User Datagram Protocol
USB Universal Serial Bus FIG. 1 shows an embodiment of an IP based network for a non-relay satellite communications network according to the invention. Any number of satellite operators or users 2-1 . . . n may use any of a variety of conventional IP compliant computing devices 3-1 . . . n such as smart phones and/or tablets and/or laptops to communicate and control a spaceborne satellite 10 via the internet 4. Each user device 3-1 . . . n runs a Remote Administrator Control Client, e.g., a software module configured to send control commands to the satellite 10 and or receive telemetry and science data therefrom. The commands are relayed through a communication gateway 6. There are a variety of commercially-available gateway communication servers that will suffice. For example, Northrop Grumman's Enhanced Communication Gateway Server (ECGS) enables broad interoperability between disparate communication systems. Gateway server 6 encodes the IP-based commands to radio frequency for transmission to satellite 10. The gateway 6 may be hosted by a government or a commercial company. The gateway 6 is in direct communication with both the satellite owner's (corporate or government) server 8 and the satellite 10. Depending on the configuration of the system, the server 8 can either be a front end or backend server. There may also be a multitude of servers 8 involved in the transaction of the data. These front end/backend servers 8 are located at the communications gateway 6. All commands and telemetry to and from the communication gateway 6 and the satellite, pass through the frontend/backend server 8. On the ground server 8 also functions as a web-based telemetry and command (T&C) system and the frontend/backend server for communication between satellite 10 and other ground systems.

In this manner all communications take place between the satellite and the ground and directly to the various subsystems on the satellite such as the EPS, C&DH, AOCS, Propulsion subsystem 17, TCS and Payload.

This same concept can be used for a relay satellite.

Figure 2:
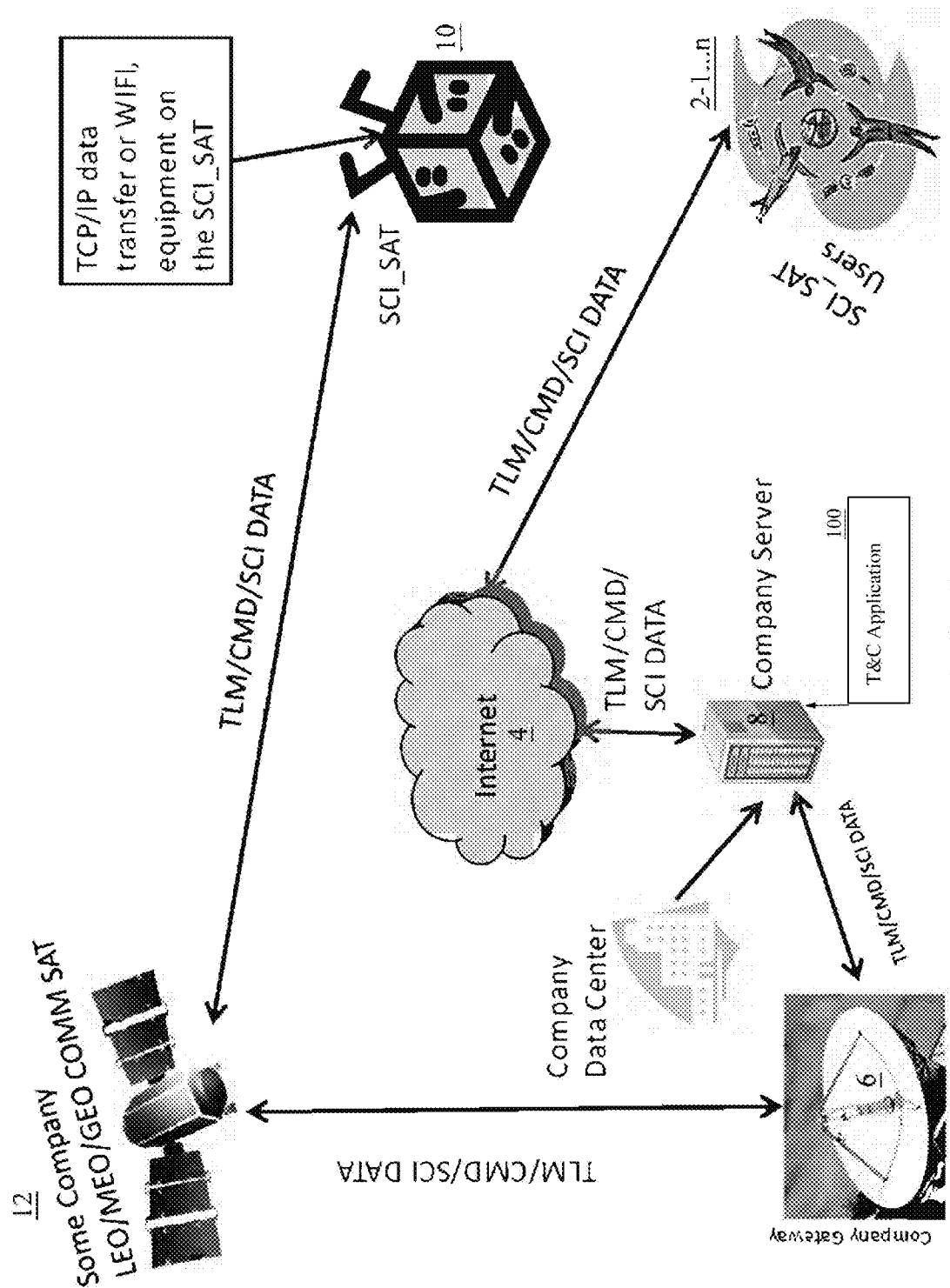
FIG. 2 shows an embodiment of an IP based network for a relay satellite communications network.

FIG. 2 shows an embodiment of an IP based network for a relay satellite communications network. While sending a command to the satellite 10, the satellite operator 2 would first use client software to send a command to a satellite gateway 6 via the internet 4, that satellite gateway 6 would send the command to a communication relay satellite 12, and finally the communication relay satellite 12 would then send the data to the main satellite 10 being commanded. For the return link, the main satellite 10 sending the data, will send the data using onboard client software to the relay satellite 12, the relay satellite 12 will then transfer the data to other relay satellites or directly to its own satellite gateway 6, the satellite gateway 6 would then deliver the data to the satellite operators and users 2.

On the ground server 8 functions as a web-based telemetry and command (T&C) system and the frontend/backend server for communication between satellite 10 and other ground systems.

The T&C system 8 is IP-based, so that TCP or UDP protocols may be used to access it. This T&C system 8 is programmed to understand the individual IP that the telemetry came from, take the subsystem prefix, and display the data. The T&C system 8 may be server-based, PC-or-laptop based, or simply a smart phone or other personal computing device. In any/all such cases T&C system 8 is IP based, and can function using TCP and or UDP protocols for sending commands or receiving telemetry. In a preferred embodiment, the T&C system on server 8 is essentially a T&C application 100 (described below with reference to FIG. 13) running on any generic computer. The T&C application 100 may be downloaded directly from the application server 8 of FIG. 12, or to a smartphone or other computing device for remote control of T&C system 8. One skilled in the art will understand that T&C application 100 may be downloaded from an offsite location on the internet. The T&C software 100 contains a mnemonic database for commands and telemetry, mapping machine-level commands to user-friendly mnemonic equivalents. This same mnemonic database is stored both on the satellite, and at ground server 8, so that both may interpret web-based telemetry, tracking, and command (T&C) mnemonics communicated between satellite 10, ground server 8 and other ground systems. This provides an additional benefit in that command implementation can be adjusted simply by changing the mnemonic database. FIG. 13 is a depiction of the T&C software 100 main user-interface display.

1. The TLM Display button 110 when clicked by the user presents various "pages" for the various subsystems and components mentioned in FIGS. 5-11. The pages are graphical displays for telemetry data. For example, one can create a power page to display telemetry related to the battery charge level, voltage, current, or power output. For example, the satellite's COMM system 20 as mentioned would downlink telemetry with a Satellite ID and intended-recipient Subsystem prefix. The T&C software 100 would acknowledge the satellite ID, and route the telemetry to corresponding pages based on the subsystem header.

2. The command button 115 launches an instant messenger (IM protocol) that allows the user to:
   a. Send commands to various subsystems
      i. Out-going commands include the satellite ID, and the subsystem header, and the satellite COMM system 20 routes the commands based on IP and subsystem header. The header serves as the host name, so the counterpart T&C software 100 on the ground has the IP addresses of the subsystems. This way a host table can be maintained on the ground and the satellite.
   b. Send table uploads using the SMTP, FTP protocols
   c. Send time driven sequences, both absolute or relative 3. The TLM Database button 120 allows the user to see the available telemetry related mnemonics. As mentioned above the Satellite subsystems in FIGS. 5-11 use the same database and during downlink send a mnemonic along with the telemetry value(s). For example, a mnemonic for the power subsystem battery temperature is PTEMPBAT. The telemetry value in ASCII may look like PTEMPBAT=17C. This information is displayed in a page related to the power subsystem 16.

4. The Command Database button 125 allows the user to select a command from the database that contain a set of mnemonics associated with that command. The Satellite subsystems in FIG. 5-11 use the same database and during uplink, the operator could simply, for example, "set ACSROLLX=1 degree" thus telling the Attitude and Orbit Control Subsystem (AOCS) 13 to roll the spacecraft in the X direction by a degree.

5. The LOGS button 130 allows the user to the types of commands sent and the telemetry received and archived. The user can also see the science data collected under the logs section, thereby allowing the user to see the science data from anywhere.

6. The Data trending button 135 allows the user to simply trend mnemonics like the battery temperature, voltage, current, and etc. This way, a user can graph and create excel reports of the trended data.

7. The Compute button 140 invokes a math engine that can compute various mnemonics related information like time, or power in watts, etc.

8. T&C Settings 145 allows the user to configure the T&C software 100 or the website, and the command and telemetry databases. This feature also allows the user to control basic settings such as fonts, colors, background, adding and making pages to display in the T&C software 100.

Again data communications take place in this manner between the EPS, C&DH, AOCS, Propulsion subsystem 17, TCS and Payload. In FIG. 2 the term SCI_SAT for satellite 10 signifies some remote sensing or scientific satellite, and the term SCI DATA is used for science data such as images or other scientific data sent down from the SCI_SAT 10.

One skilled in the art will understand that the client computing devices 3-1 . . . n may be conventional Smartphones or other IP compatible devices connected to the internet via a cell phone or other networks, running the Remote Administrator Control Client software mentioned above, and configured with capable of communicating using IP based networking protocols.

As mentioned above, the satellite 10 has a system IP bus that allows for each of the satellite subsystems and the payload(s) to communicate with one another. This system bus allows for the data to flow from each subsystem and from the payload(s), directly to ground users 2 via ground terminals 3 or relay satellites 12. Likewise, while commanding, the command would go from the USER/OPERATOR to the ground terminal 3 or relay satellite 12 and eventually to the subsystems or the payload(s), e.g., the EPS, C&DH, AOCS, Propulsion subsystem 17, TCS and payload(s).

Figure 3:
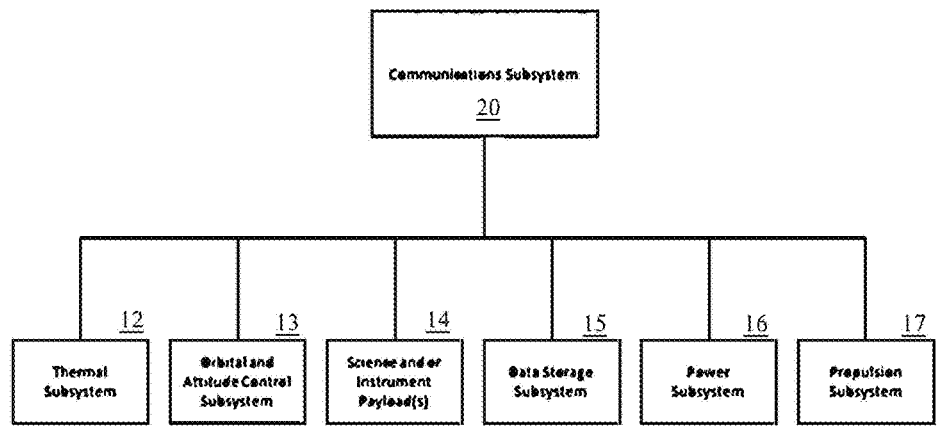
FIG. 3 is a block diagram of a satellite 10 has system bus according to the invention.

FIG. 3 is a block diagram of a satellite 10 system IP bus according to the invention. The communications subsystem 20 is the main satellite computer, and all other subsystems are in communication with the communications subsystem 20 via the IP bus. Specifically, each subsystem (TCS 12, AOCS 13, payload(s) 14, data storage subsystem 15, power subsystem 16, and propulsion subsystem 17 communicate to the communication subsystem 20 over a bidirectional satellite system IP bus. The communications subsystem 20 actually passes the commands down and takes the telemetry from each individual subsystem and the payload(s) 12-17 and sends it to the USER/OPERATOR. Each satellite subsystem 12-17 is preferably equipped with its own onboard computer, including a processor, a computer readable non-transitory storage medium, and modular software comprising instructions stored on said non-transitory storage medium for sending messages and receiving commands. Each satellite subsystem 12-17 has a computer to ensure failsafe operation, e.g., each individual subsystem is in control of itself, and if a single subsystem computer goes down, other subsystems and the satellite would still be operable. One skilled in the art will understand that the system IP bus may be wired and rely on Ethernet or USB communication protocols, or may be wireless and rely on WIFI or Bluetooth to connect various satellite components.

The software on each satellite subsystem 12-17 and on communication subsystem 20 comprises a TCP Client module for sending messages and receiving commands using the TCP/IP set of protocols. This way, all of the subsystems and the payload(s) 12-20 on the satellite 10 have their own individual computers that are IP compliant. The software on each satellite subsystem 12-17 and on communication subsystem 20 also includes hardware and software module(s) that are subsystem and or payload(s) specific, plus one or more command databases for telemetry and commanding.

Figure 4:
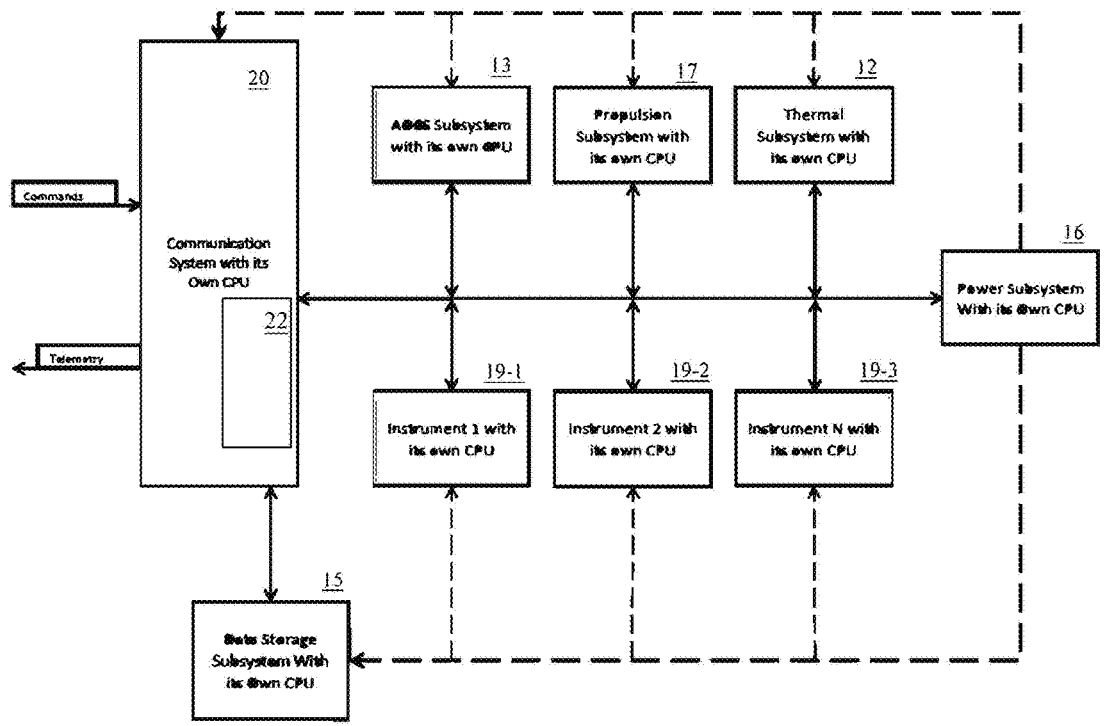
FIG. 4 is a block diagram illustrating how each subsystem 12-17 and payload 19 is connected.

FIG. 4 depicts how each subsystem and payload 12-20 is connected.

The dashed arrows indicate power flow, the voltage and current would depend on the type of equipment used, the solid arrows indicate a connection to the system bus for telemetry and command flow. The system bus originates from the COMM system 20 via either USB, Ethernet or Wireless protocols such as Bluetooth or WiFi. It can be seen that commands flow from the USER/OPERATOR into the COMM system 20, and then are routed to individual subsystems or the payload(s) 12-20. Telemetry flows back from each subsystem and the payload(s) 12-20, out through the COMM system 20, then down to the USER/OPERATOR. The COMM system 20 comprises a software based firewall for security, and a router 22 to connect to each individual subsystem 12-20. It is important to note here that each of the subsystems and payloads 12-20 has their own pre-assigned IP address. This effectively makes the satellite bus a functioning network. The router 22 routes the commands to the IP addresses of the other subsystems 12-20, and also receives telemetry. The power subsystem 16 provides the necessary voltage and current to each other individual subsystem 12-17 and the payload(s) 19, including the communication subsystem 20. Each individual subsystem 12-20 will now be described in more detail.

COMM Subsystem 20

In general terms, the COMM subsystem 20 is responsible for allowing the USER/OPERATOR to send commands to the satellite 10 (specifically to its subsystems and payloads 19 and allow for engineering data (health and safety data of various subsystems 12-17 and payloads 19 and science data (mission supporting data) to flow to the user. The COM subsystem 20 must be connected to all of the various subsystems 12-17 and the payloads 19 to allow for successful data flow.

Figure 5:
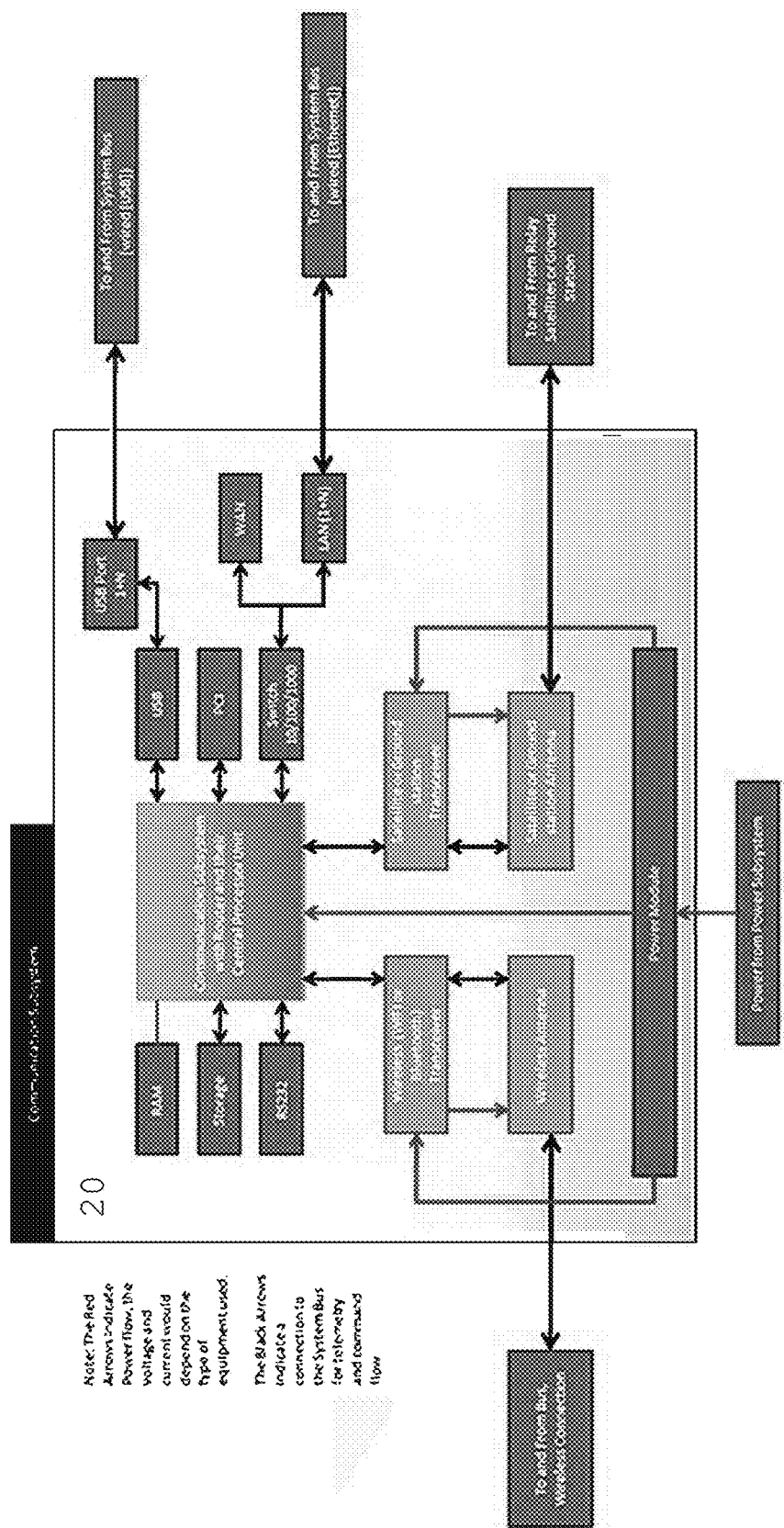
FIG. 5 is a block diagram of COMM subsystem 20.

FIG. 5 is a schematic diagram of an exemplary COMM subsystem 20 for an IP based spacecraft. The COMM subsystem 20 is equipped with its own onboard computer, including a processor, a computer readable non-transitory storage medium, and modular software comprising instructions stored on said non-transitory storage medium for sending messages and receiving commands. The COMM subsystem 20 also includes RAM memory, USB connectors, PCI slots, serial ports, and a switch with Ethernet ports. The depiction of (1+N) indicates that there can be as many ports as desired ranging from 1 to N, where N is a variable. Thus, the COMM subsystem 20 also has antenna(s) and a transceiver capable of broadcasting WIFI and Bluetooth signals, and antenna(s) and a transceiver that is able to communicate with relay satellites, other satellites, and or directly with ground terminals.

The COMM subsystem 20 is the foundation for the satellite system bus, and is essentially a router. When other subsystems are connected to it via either Ethernet, USB or WIFI or Bluetooth, COMM subsystem 20 establishes a network on the satellite 10.

As can be seen from FIG. 5 all of the various satellite subsystems 12-19 can connect to the COMM subsystem 20 via USB, Ethernet, WIFI, or Bluetooth. Also it is important to note here that one can also have a PCI or RS232-based BUS as well. The advantage of the BUS depicted in FIG. 5 is that USB, WIFI, Bluetooth, and Ethernet offer very fast data transfer speeds. This allows for the telemetry and command-flow to and from each subsystem 12-18 and payload 19 to the COMM subsystem 20. The COMM subsystem 20 includes a PC board with a CPU processor capable of running a commercial off the shelf (COTS) based operating systems (OS) such as Windows™, Linux, Android™, IOS™, Mac™ OS, Solaris™, that is TCP/IP compliant. One skilled in the art should understand that a custom OS is also possible provided it too is TCP/IP compliant. The TCP/IP protocols themselves are actually embedded in the operating system itself, along with a set of application protocols. The COMM subsystem 20 also includes a network interface layer embedded on the hardware side that forms the physical interface between the COMM subsystem 20 and the satellite system bus which defines how data packets are to be formatted for transmission and routings.

The COMM subsystem 20 also employs an application layer having the following software modules:

1. A real time instant messaging (IM) module for allowing users 2 to send commands to the satellite 10 (specifically to its subsystems 12-17 and payloads 19 and allow for engineering data (health and safety data of various subsystems 12-17 and payloads 19 and science data (mission supporting data) to flow back to the user 2. There are many application protocols that can be used to accept commands from the user 2 and to send telemetry to the user. For real-time commanding of the satellite 10, the preferred option is an instant messaging (IM) protocol. IM is a set of communication technologies used for text-based communication between participants over the Internet. The IM application on the COMM subsystem 20 would also send TLM specific to itself, and other satellite subsystems and payloads. The IM module allows real time commanding and telemetry flow. Protocols such as SMTP and FTP or alternatively file transfers via email can be used to control the satellite via stored commands, send telemetry as a file, or to send science data as a file. Optionally, the user can use the IM module to command the satellite to compile the telemetry in a file format to be sent via various user-selectable protocols such as SMTP or FTP. Also the user can use the IM module (on the ground) to send commands in a stored format to the satellite. Protocols such as SMTP and FTP can be directly used by the user to send stored commands or use a set of pre-programmed procedures.

2. A Firewall module (also at the application layer) to allow for the user 2 to control who and what gets in and out.

3. A Network Monitor Application to monitor COMM subsystem 20 health and safety. The Network Monitor Application includes a stored database of commands that are COMM board specific and telemetry that is COMM board specific.

4. A Routing Module that functions as an encoder/decoder and has access to an Internal database of routing codes to determine if commands it receives are for this satellite 10 or another, and this particular COMM subsystem 20 or something else. Conversely, COMM subsystem 20 posts telemetry via the IM/SMTP/FTP protocols that is specific to the COMM subsystem 20.

In operation, the IM module of COMM subsystem 20 receives a command and the command contains the Satellite ID and intended-recipient Subsystem prefix. Each subsystem has its own IP address, and so the Routing Module of COMM system 20 will route the appropriate commands to each subsystem based on IP address. One skilled in the art will readily understand that the IM module of COMM subsystem 20 may receive a set of commands (each satellite may fly a set of instructions that are acted automatically based on time). Any set of instructions may be sent via email (SMTP) or FTP to the COMM subsystem 20. So for any prefix that is not recognized by the COMM system 20, the Routing Module of COMM system 20 will have in its database a table to route based on prefix and IP address. This way, commands meant for AOCS for example, would be routed to the AOCS by the COMM subsystem 20. All non-"automated, pre-programmed command instruction sets" are presumed to be individual commands sent via IM individually.

Telemetry is in real time when internet connectivity exists (while the satellite is communications with a relay network or ground network), so all telemetry points and or event messages (individual to each subsystem) are sent via IM/SMTP/FTP protocols. The routine telemetry can be packetized by their individual components, and each telemetry message contains satellite ID and subsystem prefix. The telemetry messages flow from subsystems to COMM subsystem 20, and then to the user.

5. A Parent Application for instantiating the IM Application, SMTP/FTP functionality, Firewall module, Routing Module, and Network Monitor Application above. In operation, as soon as power is fed to the COMM subsystem 20 it boots-up and loads the Parent Application automatically, and the Parent Application launches the IM Application, SMTP/FTP functionality, Routing Module, Firewall module, and Network Monitor Applications as child processes. The TCP/IP based protocols and protocol-related applications and functionalities load as part of the operating system.

Since each of the satellite 10 subsystems 12-17 and payloads 19 have an internal computer and are connected to the IP bus, each is assigned its own IP address. The COMM subsystem 20 Parent Application, listens for commands that are meant for other subsystems 12-17 and/or payloads 19. The command structure here can be binary, hex or ASCII or other formats. In a preferred embodiment each command sent or received by the COMM subsystem 20 Parent Application includes a satellite ID, followed by the subsystem prefix, followed by a command mnemonic and data values. In use the satellite ID is stripped off by the COMM subsystem 20, and the subsystem prefix is used to direct that command to the appropriate subsystem 12-17 or payload 19 or user device 3 or CMD center on the network. Thus, the internal database of routing codes includes a first database of prefixes that pertain to individual subsystems 12-17, payloads 19 and the COMM subsystem 20 itself. The Parent Application relies on this internal database to decipher the commands and route them to carry out an action such as turning on the transceiver. Telemetry works in the opposite direction. Each subsystem 12-17 and payload 19 has its own command and telemetry database, and so that particular subsystem or payload would attach a prefix to the telemetry point followed by the particular mnemonic and values. This information would then be transferred to the COMM subsystem 20 IM protocol application (or SMTP or other), and sent down to the user 2.

The COMM subsystem 20 Parent Application always listens for commands that from the user 2 or input from the various subsystems 12-17 and telemetry from payloads 19. One skilled in the art will understand that it is best to have internet connection established around the clock, and various communications networks like Iridium/TDRS/INMARSAT may be best suited for this purpose. As a failsafe, when no internet connection is available, the 20 COMM subsystem 20 of satellite 10 defaults to an offline operating mode where TLM/SCI data is stored and archived. The TLM/SCI data then is relayed when next contact is made.

The COMM subsystem 20 Parent Application also controls the hardware associated with it including the following:
1. Control Power Module
2. Control Wireless Transceiver and Antenna
3. Control Transceiver and Antenna
4. Control CPU and RAM
5. Control USB and Ethernet Inputs and Outputs
6. Control storage
7. Control PCI slots and serial (RS232) inputs/outputs The advantage of this bus is the fact that data can travel very quickly via USB, Ethernet, Bluetooth, and WIFI.

The COMM subsystem 20 Parent Application has its own fault detection system. This fault detection can take steps if any set limits are violated for any of the telemetry mnemonics. There can be a many mnemonics defined for each particular piece of hardware on the COMM subsystem 20. The Parent Application includes software code for detecting faults and violations of mnemonic limits, correcting where possible, automatically sending the user an email or a message for each fault and correction. Each mnemonic can have various limit violation levels.

The COMM subsystem 20 parent application is TCP and UDP compliant. The user can choose the setting based on preference. The stored command processor contains a command load; each command has a mnemonic that starts with a specific prefix followed by the mnemonic value. Based on the prefix, the COMM subsystem 20 parent application routes the commands to the necessary subsystems 12-17 and payloads 19. The COMM subsystem 20 receives telemetry data from the payloads 19 and transmit the data directly to a user 2 or CMD center on the ground. This direct transfer of science or mission specific data is preferably programmed into the parent application residing on the COMM subsystem 20. Because TCP packet information can be read by the application layer, the COMM subsystem 20 operating system keeps track of sent and received packets and commands. Any missed packets or commands would then be requested for re-transmission. Conventional operating systems have a default timeout inherent to their TCP protocol, e.g., four (4) minutes, and TCP transmit and re-transmit are taken care of by the operating system. However, the conventional TCP operating margins can be a problem when trying to reach the satellite in emergency or other situations. For this purpose, the COMM subsystem 20 Parent Application monitors the COMM subsystem 20 operating system for repeated timeouts and may selectively or automatically switch to User Datagram Protocol (UDP), allowing the satellite to function in UDP under blind acquisition circumstances and during other times when data quality need not be 100%. Also telemetry data may be transmitted via UDP when there is no need to acknowledge transmission.

In light of the foregoing, the COMM subsystem 20 effectively makes the satellite 10 a part of the user 2 network. Since the satellite would have its own set of mnemonic databases for commands and telemetry, it can be programmed to have various levels of automation.

Power Subsystem 16

The power subsystem 16 provides the necessary currents and voltages for the entire satellite 10.

Figure 6:
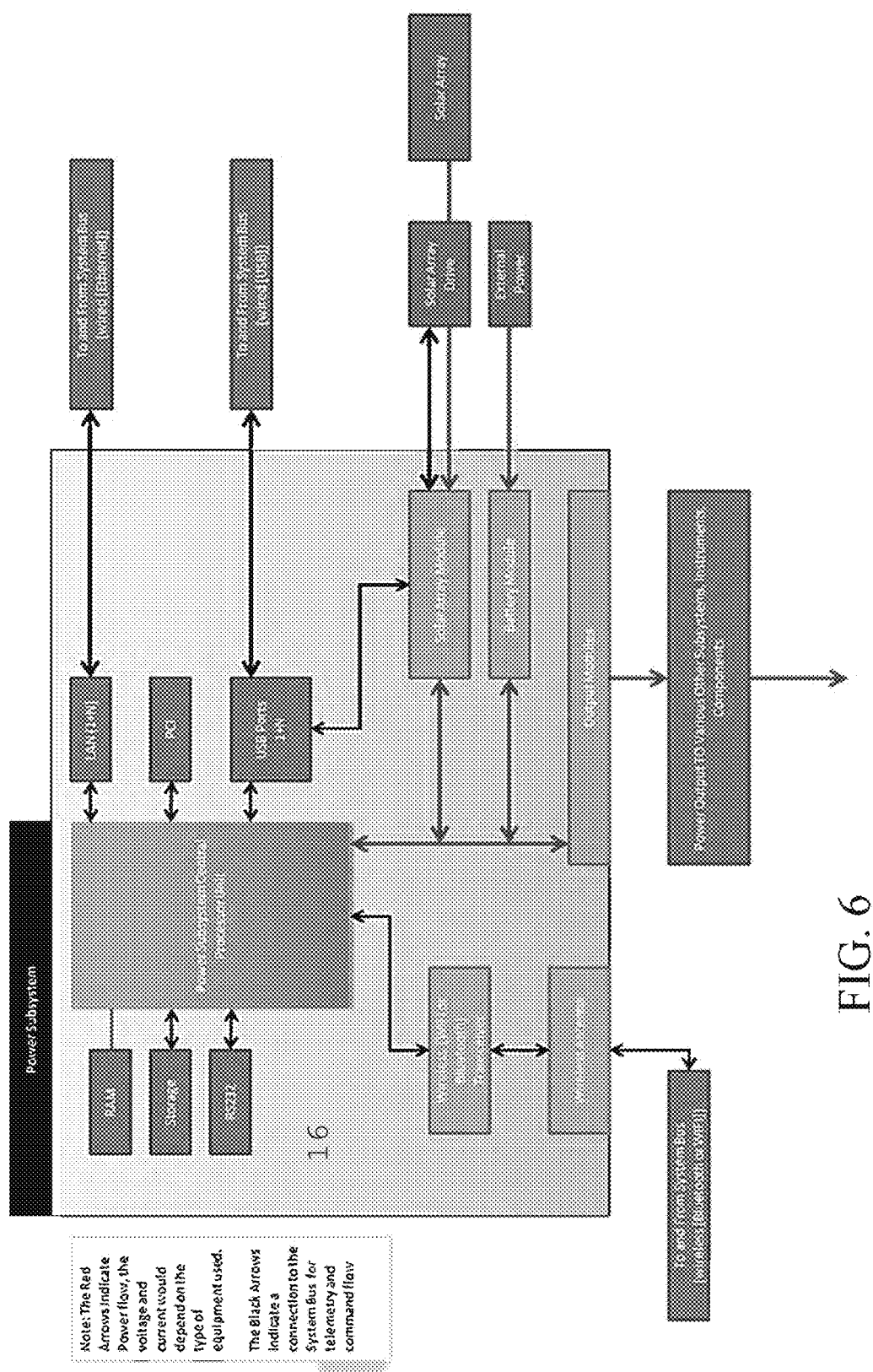
FIG. 6 is a flow chart depicting a suitable TCP/IP compliant power subsystem 16.

FIG. 6 is a flow chart depicting a suitable IP compliant power subsystem 16. The power subsystem 16 is in communication with the COMM subsystem 20 via either the Ethernet or USB or WIFI or Bluetooth. The power subsystem 16 is equipped with its own onboard computer, including a processor, a computer readable non-transitory storage medium, and modular software comprising instructions stored on said non-transitory storage medium for sending messages and receiving commands. The power subsystem 16 also includes USB connectors, PCI slots, serial (e.g. RS232) ports, and a switch with Ethernet ports. The depiction of (1+N) indicates that there can be as many ports as desired ranging from 1 to N, where N is a variable. The power subsystem 16 is TCP/IP compliant and as above includes software modules including a Parent Application for instantiating its other applications as soon as power is fed to the power subsystem 16. It boots-up and loads the Parent Application automatically, and the Parent Application launches a COMM protocol child application as a child process for communicating with the COMM subsystem 20. The TCP/IP based protocols and protocol-related applications and functionalities load as part of the operating system. As with the COMM subsystem 20, the power subsystem 16 stores Mnemonic Databases for commands and telemetry, and employs the COMM protocol child application to send telemetry to the COMM subsystem 20 and to receive commands from the COMM subsystem 20. The power subsystem 16 parent application also control the following on-board hardware:

1. Control Power Module
2. Control Wireless Transceiver and Antenna
3. Control CPU and RAM
4. Control USB and Ethernet Inputs and Outputs
5. Control Storage Device
6. Control PCI slots and serial inputs/outputs
7. Control the Solar Array drive motor (to ensure that the solar array can track the sun if needed)
8. Control Battery settings A tracking solar array may not be necessary for the mission, but where included the tracking solar array is directly attached to the power subsystem 16 input via USB. A satellite that works based on TCP/IP, can also utilize a Radio Isotope Thermoelectric Generator (RTG). The power subsystem 16 parent app would also have its own set of fault detection and correction code. This fault detection code can take steps if any set limits are violated for any of the telemetry mnemonics. There can be a many mnemonics defined for each particular piece of hardware on the power board.

Attitude and Orbit Control Subsystem (AOCS) 13

The AOCS 13 is responsible for providing the proper pointing, and the orbit control required for the satellite 10 to complete its mission. The AOCS board is connected to the COMM subsystem via either the Ethernet or USB or WIFI or Bluetooth. FIG. 4-5 below, depicts an IP compliant AOCS board.

Figure 7:
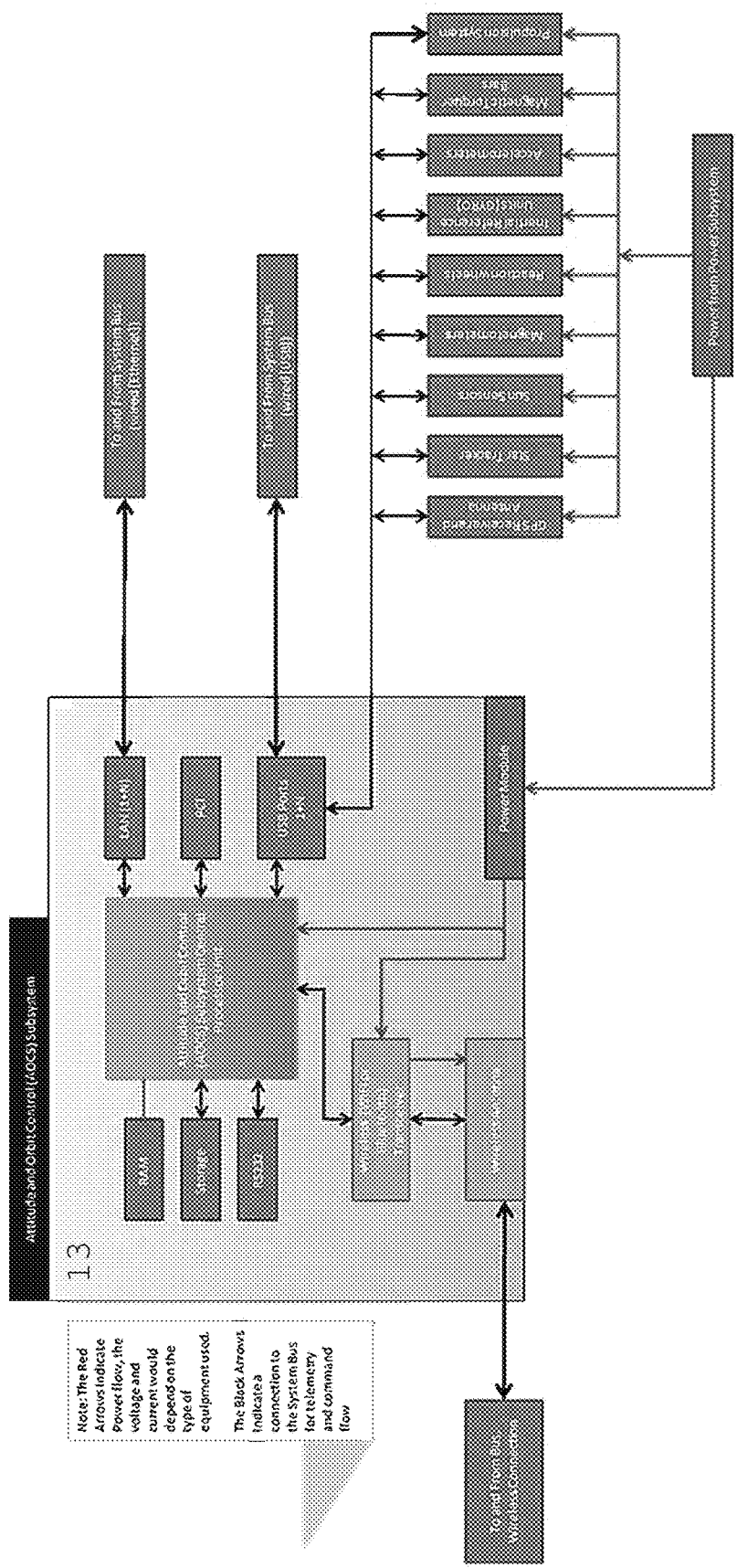
FIG. 7 is a flow chart depicting a suitable TCP/IP compliant AOCS 13.

FIG. 7 is a flow chart depicting a suitable TCP/IP compliant AOCS 13. The AOCS 13 is in communication with the COMM subsystem 20 via either the Ethernet or USB or WIFI or Bluetooth. The AOCS 13 is equipped with its own onboard computer, including a processor, a computer readable non-transitory storage medium, and modular software comprising instructions stored on said non-transitory storage medium for sending messages and receiving commands. The AOCS 13 also includes USB connectors, PCI slots, serial ports, and a switch with Ethernet ports. The depiction of (1+N) indicates that there can be as many ports as desired ranging from 1 to N, where N is a variable. The AOCS 13 is TCP/IP compliant and as above includes software modules including a Parent Application for instantiating its other applications as soon as power is fed to the AOCS 13. It boots-up and loads the Parent Application automatically, and the Parent Application launches a COMM protocol child application as a child process for communicating with the COMM subsystem 20. The TCP/IP based protocols and protocol-related applications and functionalities load as part of the operating system. As with the COMM subsystem 20, the AOCS subsystem 13 stores Mnemonic Databases for commands and telemetry, and employs the COMM protocol child application to send telemetry to the COMM subsystem 20 and to receive commands from the COMM subsystem 20.

The AOCS 13 is connected to various sensors for input. As seen in FIG. 7 the various sensors may include sun sensors, star trackers, and various other sensors all connected to the AOCS 13 via USB, Ethernet, serial ports or PCI slots. The AOCS subsystem 13 also employs the COMM protocol child application to communicate directly with the propulsion subsystem 17 as well. The parent application of the ACOS 13 would boot up when the board powers on and is responsible for controlling the following hardware:

1. Control Power Module
2. Control Wireless Transceiver and Antenna
3. Control CPU and RAM
4. Control USB and Ethernet Inputs and Outputs
5. Control Storage Device
6. Control PCI slots and serial (e.g. RS232) inputs/outputs
7. Control the Sun Sensors
8. Control Star Tracker
9. Control GPS Receiver and Antenna
10. Control the Magnetometers
11. Control Reaction Wheels
12. Control Gyroscopes
13. Control Accelerometers
14. Control Magnetic Torquer Bars
15. Send Input to the Propulsion subsystem 17
    a. Send Automated Commands to the propulsion subsystem 17
    b. Receive Telemetry directly from the propulsion subsystem 17

The AOCS 13 board parent software also has its own fault detection system. This fault detection can take steps if any set limits are violated for any of the telemetry mnemonics. There can be a many mnemonics defined for each particular piece of hardware on the AOCS 13. The AOCS 13 relies on Mnemonic Databases for commands and telemetry, and the Parent Application calls an IM protocol child application to send telemetry to the COMM subsystem 20 and to receive commands from the COMM subsystem 20. Given that each subsystem has its own IP address, the COMM subsystem route messages (commands) to each subsystem based on IP address. Each subsystem including the AOCS 13 has its own IM client that interprets individual commands.

Each of the multiple sensors depicted in FIG. 7 is preferably TCP/IP compliant as well. Since the AOCS subsystem 13 is connected to the COMM subsystem 20, telemetry flows directly to the COMM subsystem 20.

Propulsion Subsystem 17

There are various types of propulsion systems ranging from a blow down tank model, to electric propulsion, to nuclear propulsion. The propulsion subsystem 17 is connected to the COMM subsystem 20 via either the Ethernet or USB or WIFI or Bluetooth. The propulsion subsystem 17 can be controlled by the AOCS 13, or can be controlled by the user 2 directly.

Figure 8:
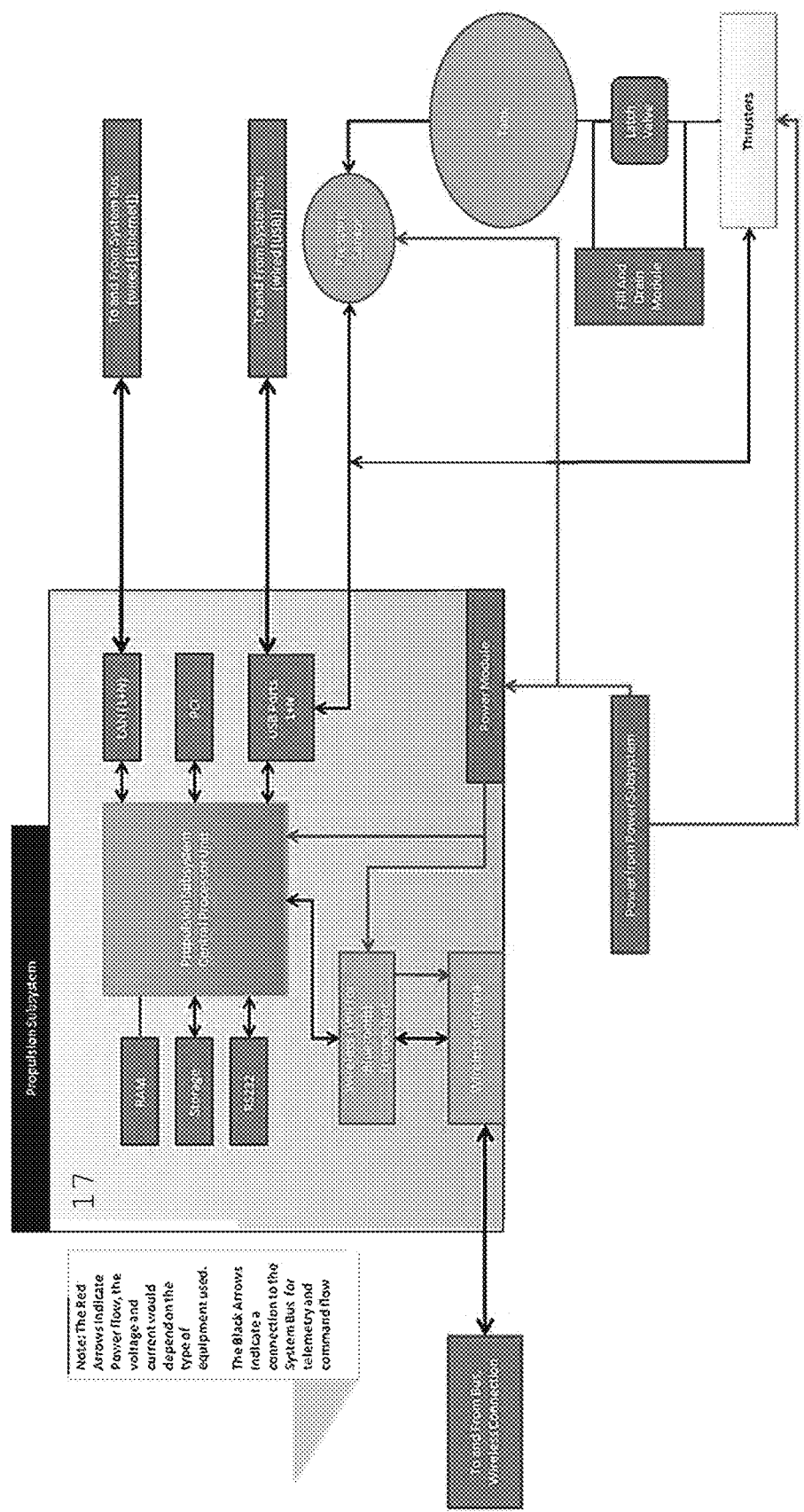
FIG. 8 is a flow chart depicting a suitable TCP/IP compliant Propulsion subsystem 17.

FIG. 8 is a flow chart depicting a suitable TCP/IP compliant Propulsion subsystem 17. The Propulsion subsystem 17 is in communication with the COMM subsystem 20 via either the Ethernet or USB or WIFI or Bluetooth. The Propulsion subsystem 17 is equipped with its own onboard computer, including a processor, a computer readable non-transitory storage medium, and modular software comprising instructions stored on said non-transitory storage medium for sending messages and receiving commands. The Propulsion subsystem 17 also includes USB connectors, PCI slots, serial (e.g. RS232) ports, and a switch with Ethernet ports. The depiction of (1+N) indicates that there can be as many ports as desired ranging from 1 to N, where N is a variable. The Propulsion subsystem 17 is TCP/IP compliant and as above includes software modules including a Parent Application for instantiating its other applications as soon as power is fed to the Propulsion subsystem 17. It boots-up and loads the Parent Application automatically, and the Parent Application launches a COMM protocol child application as a child process for communicating with the COMM subsystem 20. The TCP/IP based protocols and protocol-related applications and functionalities load as part of the operating system. As with the COMM subsystem 20, the Propulsion subsystem 17 stores Mnemonic Databases for commands and telemetry, and employs the COMM protocol child application to send telemetry to the COMM subsystem 20 and to receive commands from the COMM subsystem 20.

The propulsion subsystem 17 Parent Application includes its own fault detection system. This fault detection can take steps if any set limits are violated for any of the telemetry mnemonics. There can be a many mnemonics defined for each particular piece of hardware on the propulsion board. The Propulsion subsystem 17 relies on Mnemonic Databases for commands and telemetry, and its Parent Application calls an IM protocol child application to send telemetry to the COMM subsystem 20 and to receive commands from the COMM subsystem 20. Again, given that each subsystem has its own IP address, the COMM subsystem 20 routes messages (commands) to each subsystem based on IP address. Each subsystem including the propulsion subsystem 17 has its own IM client that interprets individual commands. The Parent Application of the propulsion subsystem 17 board boots up when the board powers on and is responsible for controlling the following hardware:

1. Control Power Module
2. Control Wireless Transceiver and Antenna
3. Control CPU and RAM
4. Control USB and Ethernet Inputs and Outputs
5. Control Storage Device
6. Control PCI slots and serial RS232 inputs/outputs
7. Control the Tank Pressure Sensors
8. Control the Thrusters
9. Control the Fill and Drain Module and Control the Latch Valve It is important to note here that the type of propulsion subsystem 17 depicted in FIG. 8 is a blow down system. One skilled in the art will understand that there are various other types of propulsion systems that can be used. These propulsion systems would have a control electronic that is connected to the pain propulsion subsystem 17 power board via USB or Ethernet or Bluetooth or WIFI.

Data Storage Subsystem (DSS) 15

The main goal of the DSS 15 is to store all mission data. Although each subsystem 12-17 is depicted to have its own storage, the DSS 15 is a collection of data for all other subsystems 12-17. The data from the satellite bus is sent to DSS 15 from the COMM subsystem 20 for archival purposes. Telemetry and science data is stored here for future access. The user can program the old data to be deleted at a determined interval or time.

Figure 9:
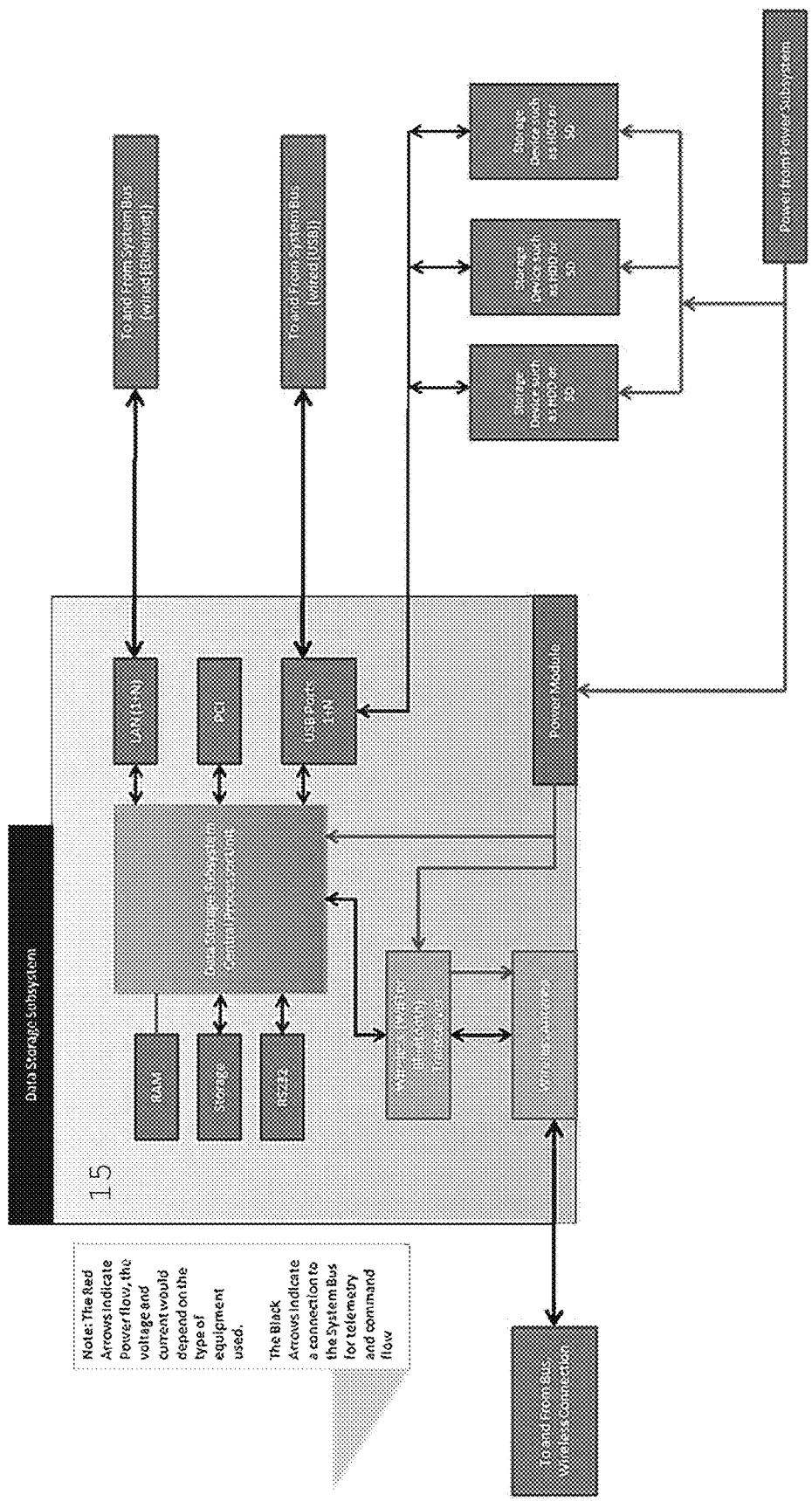
FIG. 9 is a flow chart depicting a suitable TCP/IP compliant DSS 15.

FIG. 9 is a flow chart depicting a suitable TCP/IP compliant DSS 15. The DSS 15 includes its own power module like the other subsystems, which in this instance preferably includes backup batteries. Typically, the DSS 15 will receive unregulated power from the power subsystem 16 and the power module will regulate it. However, if the storage devices attached via USB need additional power, it can be drawn alternately from the power subsystem 16 or, if necessary, backup batteries. The DSS 15 is in communication with the COMM subsystem 20 via either the Ethernet or USB or WIFI or Bluetooth. The DSS 15 is equipped with its own onboard computer, including a processor, a computer readable non-transitory storage medium, and modular software comprising instructions stored on said non-transitory storage medium for sending messages and receiving commands. The DSS 15 also includes USB connectors, PCI slots, serial (RS232) ports, and a switch with Ethernet ports. The depiction of (1+N) indicates that there can be as many ports as desired ranging from 1 to N, where N is a variable. The DSS 15 is TCP/IP compliant and as above includes software modules including a Parent Application for instantiating its other applications as soon as power is fed to the DSS 15. It boots-up and loads the Parent Application automatically, and the Parent Application launches a COMM protocol child application as a child process for communicating with the COMM subsystem 20. The TCP/IP based protocols and protocol-related applications and functionalities load as part of the operating system.

The DSS 15 Parent application that relies on Mnemonic Databases for commands and telemetry, and its Parent Application calls an IM protocol child application to send telemetry to the COMM subsystem 20 and to receive commands from the COMM subsystem 20. Once again, given that each subsystem has its own IP address, the COMM subsystem 20 routes messages (commands) to each subsystem based on IP address. Each subsystem including the DSS 15 has its own IM client that interprets individual commands. The DSS 15 Parent Application controls the following hardware:

1. Control Power Module
2. Control Wireless Transceiver and Antenna
3. Control CPU and RAM
4. Control USB and Ethernet Inputs and Outputs
5. Control Storage Device
6. Control PCI slots and serial (RS232) inputs/outputs
7. Control Various SD Card Readers (equipped with SD cards)
8. Control Solid State Drives (connected via USB)

Thermal Subsystem 12

The thermal subsystem is tasked with keeping the satellite 10 components at their required temperatures. Various heaters and/or coolers can be used here, and the use would depend on the individual subsystem or payload requirement. The thermal subsystem board is connected to the COMM subsystem 20 via either the Ethernet or USB or WIFI or Bluetooth. An active thermal subsystem may not be required. Passive devices such as insulation can be used.

Figure 10:
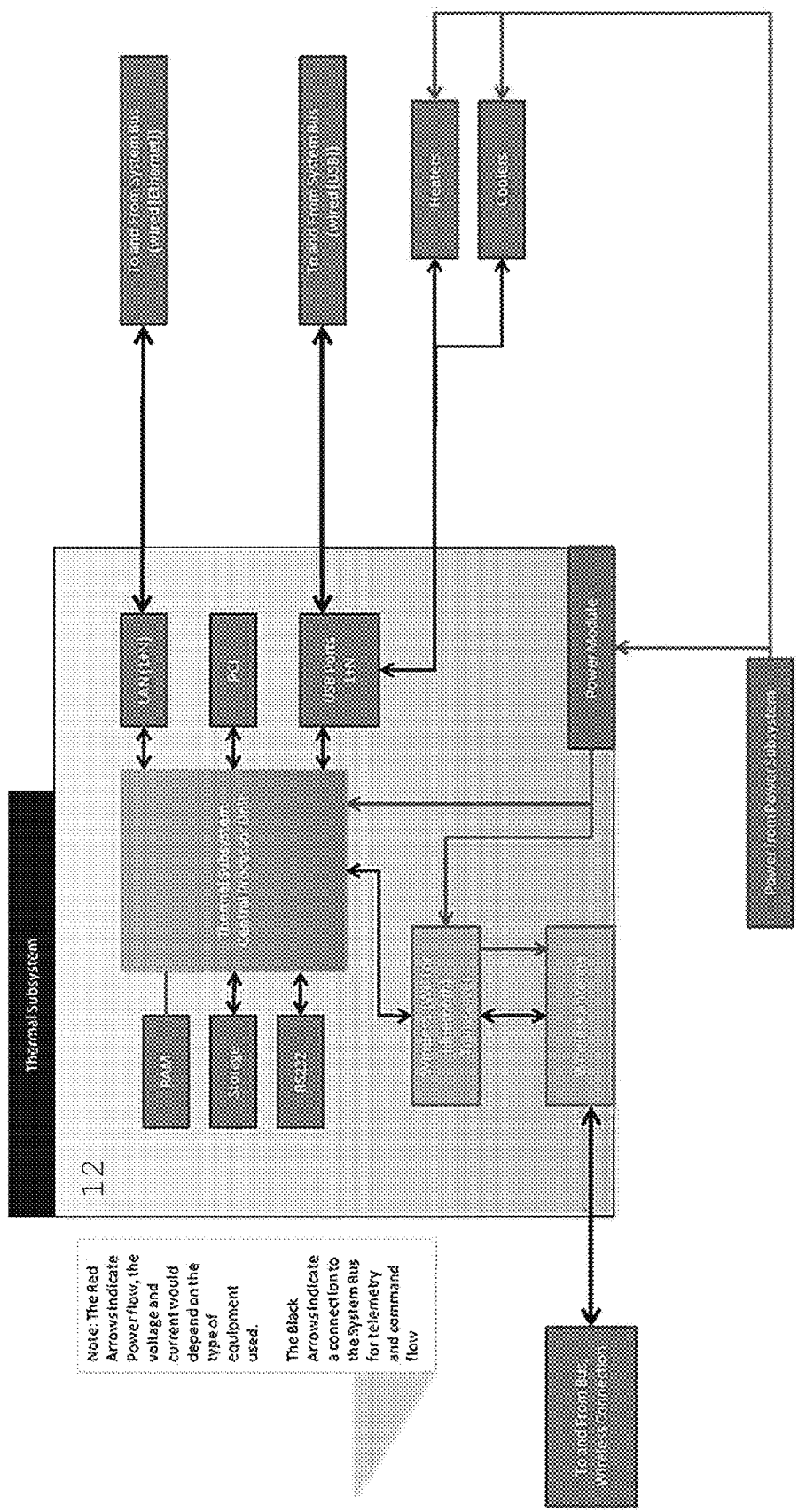
FIG. 10 is a flow chart depicting a suitable TCP/IP compliant Thermal Subsystem 12.

FIG. 10 is a flow chart depicting a suitable TCP/IP compliant Thermal Subsystem 12. The Thermal Subsystem 12 is in communication with the COMM subsystem 20 via either the Ethernet or USB or WIFI or Bluetooth. The Thermal Subsystem 12 is equipped with its own onboard computer, including a processor, a computer readable non-transitory storage medium, and modular software comprising instructions stored on said non-transitory storage medium for sending messages and receiving commands. The Thermal Subsystem 12 also includes USB connectors, PCI slots, serial (e.g. RS232) ports, and a switch with Ethernet ports. The depiction of (1+N) indicates that there can be as many ports as desired ranging from 1 to N, where N is a variable. The Thermal Subsystem 12 is TCP/IP compliant and as above includes software modules including a Parent Application for instantiating its other applications as soon as power is fed to the Thermal Subsystem 12. It boots-up and loads the Parent Application automatically, and the Parent Application launches a COMM protocol child application as a child process for communicating with the COMM subsystem 20. The TCP/IP based protocols and protocol-related applications and functionalities load as part of the operating system. As with the COMM subsystem 20, the Thermal Subsystem 12 stores Mnemonic Databases for commands and telemetry, and employs the COMM protocol child application to send telemetry to the COMM subsystem 20 and to receive commands from the COMM subsystem 20.

The Thermal Subsystem 12 Parent Application includes its own fault detection system. This fault detection can take steps if any set limits are violated for any of the telemetry mnemonics. There can be a many mnemonics defined for each particular piece of hardware on the propulsion board.

The Thermal subsystem board Parent Application controls the following hardware:
1. Control Power Module
2. Control Wireless Transceiver and Antenna
3. Control CPU and RAM
4. Control USB and Ethernet Inputs and Outputs
5. Control Storage Device
6. Control PCI slots and serial (RS232) inputs/outputs
7. Control of various heaters
8. Control of various coolers From FIG. 10 it can be see that the heaters and coolers are connected via USB. For additional power, the power from the power subsystem 16 can be connected. The USB allows for data flow and to allow the main CPU to control the heaters and coolers.

Payload(s) 19

The payload(s) 19 are inherently mission specific. There can be multiple types of different payloads. Typically satellite 10 will be designed around the main payload 19, and each subsystem would allow the payload 19 to accomplish its tasks.

Figure 11:
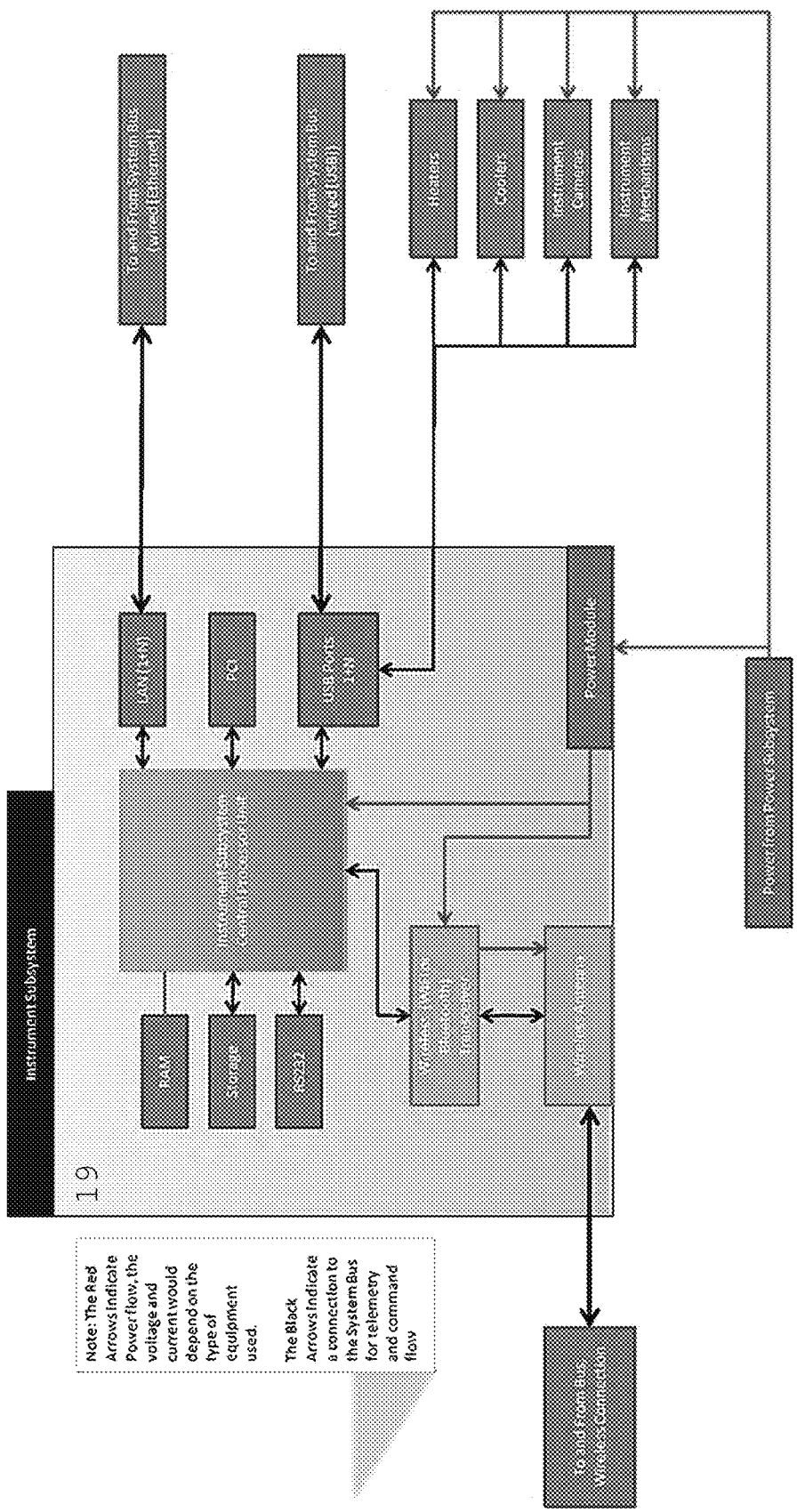
FIG. 11 is a block diagram of a payload 19 comprising a generic instrument that contains a camera.

FIG. 11 is a flow chart depicting a suitable TCP/IP compliant Payload 19.

The Payload 19 is in communication with the COMM subsystem 20 via either the Ethernet or USB or WIFI or Bluetooth. There may be multiple Payloads 19, and each Payload 19 is equipped with its own onboard computer, including a processor, a computer readable non-transitory storage medium, and modular software comprising instructions stored on said non-transitory storage medium for sending messages and receiving commands. The Payload(s) 19 also includes USB connectors, PCI slots, serial (e.g. RS232) ports, and a switch with Ethernet ports. The depiction of (1+N) indicates that there can be as many ports as desired ranging from 1 to N, where N is a variable. Payload (s) 19 are each TCP/IP compliant and as above include software modules including a Parent Application for instantiating its other applications as soon as power is fed to the Payload(s) 19. The Payload 19 boots-up and loads the Parent Application automatically, and the Parent Application launches a COMM protocol child application as a child process for communicating with the COMM subsystem 20. The TCP/IP based protocols and protocol-related applications and functionalities load as part of the operating system. As with the COMM subsystem 20, the Payload(s) 19 store Mnemonic Databases for commands and telemetry, and employs the COMM protocol child application to send telemetry to the COMM subsystem 20 and to receive commands from the COMM subsystem 20.

The Payload(s) 19 Parent Application includes its own fault detection system. This fault detection can take steps if any set limits are violated for any of the telemetry mnemonics. There can be a many mnemonics defined for each particular piece of hardware on the propulsion board.

The Payload 19 depicted in FIG. 11 is a generic instrument that contains a camera. The main objective of FIG. 11 is to depict a payload 19 that is TCP/IP compatible. This generic instrument system has its own set of thermal control, instrument cameras, and instrument mechanisms. All of the devices such as cameras and mechanisms are connected via USB to the main board. Additional power can be drawn from the power subsystem 16. The Generic Instrument subsystem board would have its own parent application that would control the following hardware:
1. Control Power Module
2. Control Wireless Transceiver and Antenna
3. Control CPU and RAM
4. Control USB and Ethernet Inputs and Outputs
5. Control Storage Device
6. Control PCI slots and serial RS232 inputs/outputs
7. Control of various heaters
8. Control of various coolers
9. Control Cameras
10. Control Instrument Mechanisms All the data from Payload(s) 19 is internally stored and sent to the COMM subsystem 20 at a user specified interval.

Ground System Architecture

FIGS. 1 and 2 described above depict an overall path the data from the satellite 10 would take if it were transmitting directly to a ground terminal 3 or to a relay satellite 12. The advantage of TCP/IP communications is that the user 2 can have almost any TCP/IP compliant communications device and be able to communicate. All the mission specific data, transfers automatically from the various subsystems 12-17 and payload(s) 19 to the COMM subsystem 20. The ground software is also necessarily TCP/IP compliant.

Figure 12:
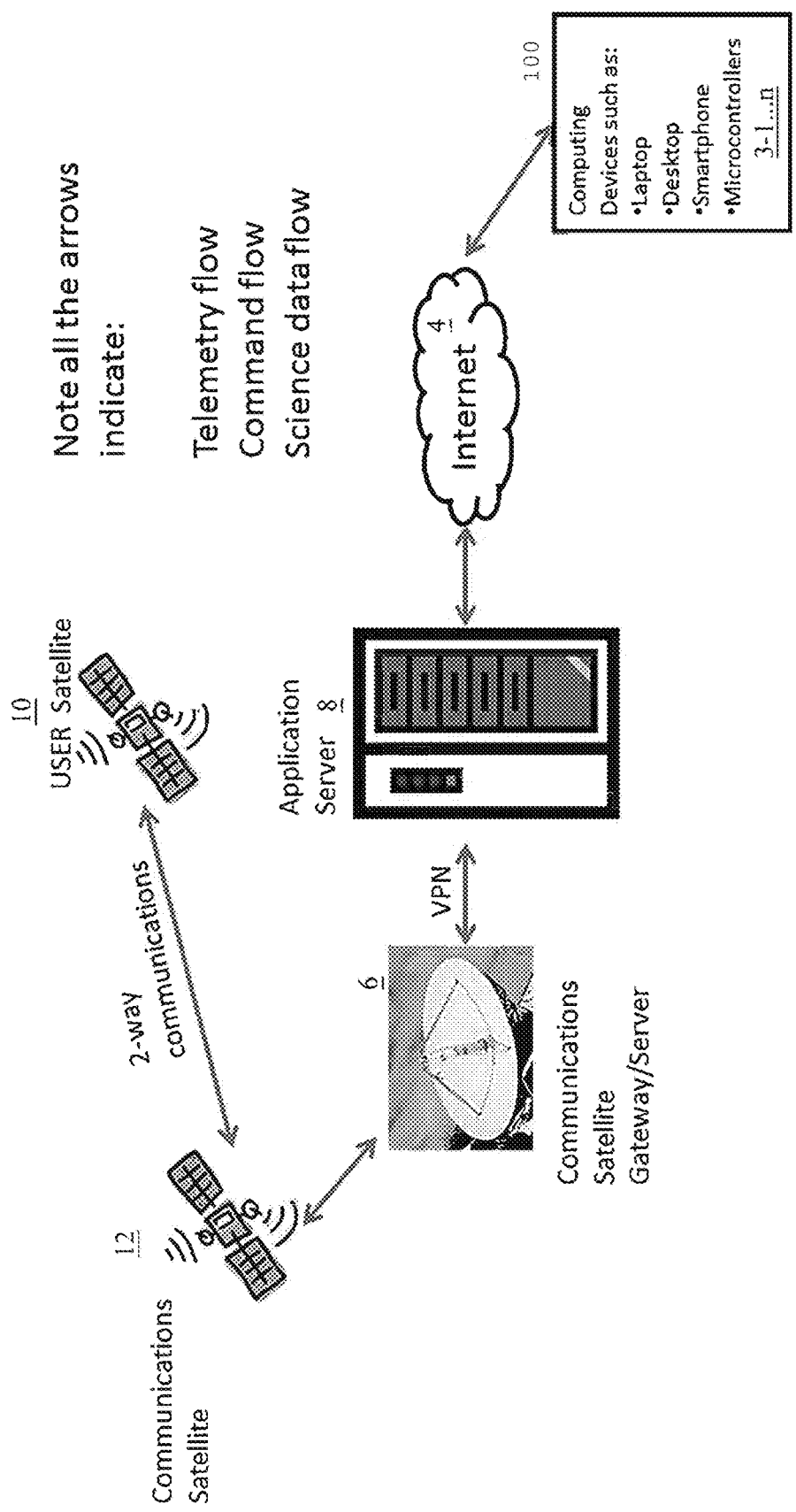
FIG. 12 is a flow diagram illustrating how the information flows from a computing device that communicates to the user 2 via a relay satellite 12.
Figure 13:
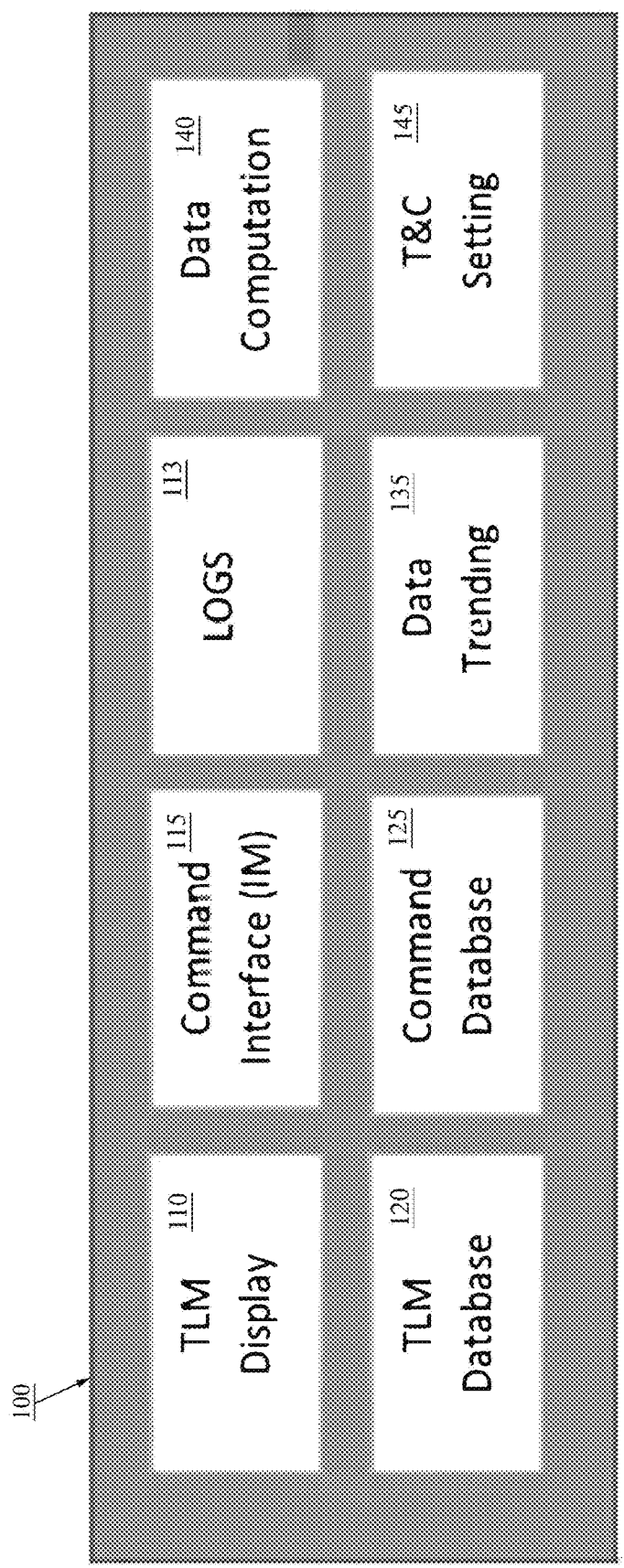
FIG. 13 is a diagram that depicts the T&C subsystem.

FIG. 12 is a flow diagram illustrating how the information flows from a computing device that communicates to the user 2 via a relay satellite 12. Commands can be sent via the internet 4 to the user satellite 10, and that data can flow from the user satellite 10 to a computing device 3-1 . . . n on the ground. The application server 8 is the front end server while sending commands. The application it contains present various XML or other computer language based display windows to depict the telemetry from various satellite subsystems 12-17 and payload(s) 19. The application server 8 also contains an Instant Messenger client application to allow the users 2 to send commands to the satellite 10. The computing device 3 on the user side runs a thin-client front-end application that connects to the application server 8. Thus, this thin-client front-end application on computing device 3 performs the following roles:

1. Connect the Application server 8
2. Contain an Instant Messenger to allow for commanding
3. Depict various subsystem and payload windows to show telemetry and science data.

All of the science and telemetry data may be mirrored from the DSS 15 to the application server 8 or another storage location such as an array of cloud servers. The data is preferably used to populate a website. The HTTPS protocol can be used to access this website. Also various mobile devices operated by the satellite controllers and users, can download an application that would connect to the web server and act as a client. This client would be compatible with IM/SMTP/FTP/HTTPS and various other application protocols to allow the controllers and users to command the satellite and to see telemetry and mission specific data.

As it can be seen from the various FIGS. 1-12 the satellite system can be wireless or wired. Each particular subsystem 12-17 and payload 19 has its own CPU and is compatible with the TCP/IP protocol. Each subsystem may have its own wireless antenna, making the satellite 10 wireless for internal data transfer. A wired bus is also possible, and typically faster. With a Web Based ground system, the user can access the data from anywhere via any TCP/IP capable computing device. Although a satellite subsystem is being discussed here, this type of application can be applied for almost any type of command, control, and data transfer use.

It should now be apparent that the invention provides a turnkey IP-based satellite bus and method for satellite control in space. This permits operations control on-orbit, in near real time within a secure system environment, with a dramatic increase in mission efficiency, an expansion of how much and what can be done on-orbit, and cost savings on future missions using IP-compliant spacecraft and payloads.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A system for satellite terminal control, comprising:
a satellite including,
a plurality of on-board subsystems and payloads each having a programmable computer including non-transitory memory storing software resident on the programmable computer for communication using IP protocol, each of said plurality of on-board subsystems and payloads each having a unique identifier stored in its non-transitory memory, and each being programmed to embed its unique identifier in every outgoing communication, and
a bi-directional data bus connecting all of said plurality of on-board subsystems and payloads; and
a ground-based communication station comprising a programmable computer including software resident on the programmable computer for web-based telemetry and command (T&C) system of said earth-orbiting satellite by communication therewith using IP protocol.

2. The system for satellite terminal control according to claim 1, wherein said unique identifiers are unique IP addresses.

3. The system for satellite terminal control according to claim 1, wherein all of said plurality of on-board subsystems and payloads each have software resident on the programmable computer for interpreting commands transmitted to said satellite from said ground station using IP protocol.

4. The system for satellite terminal control according to claim 1, wherein said software resident on the programmable computer of all of said plurality of on-board subsystems and payloads comprises a firewall module.

5. The system for satellite terminal control according to claim 1, wherein said software resident on the programmable computer of all of said plurality of on-board subsystems and payloads comprises an application server for executing applications.

6. The system for satellite terminal control according to claim 1, wherein said bi-directional data bus is hardwired.

7. The system for satellite terminal control according to claim 6, wherein said wired bi-directional data bus is one of Ethernet and universal serial bus (USB).

8. The system for satellite terminal control according to claim 1, wherein said bi-directional data bus is wireless.

9. The system for satellite terminal control according to claim 8, wherein said wireless bi-directional data bus is one of WIFI and Bluetooth.

10. The system for satellite terminal control according to claim 1, wherein said plurality of on-board subsystems and payloads comprises a communications subsystem including a transceiver configured for broadcasting WIFI and Bluetooth signals and an antenna for sending messages and receiving commands.

11. The system for satellite terminal control according to claim 10, wherein said plurality of on-board subsystems and payloads comprise a power subsystem for supplying power to all of said plurality of on-board subsystems and payloads.

12. The system for satellite terminal control according to claim 11, wherein said plurality of on-board subsystems and payloads comprises an Attitude and Orbit Control Subsystem (AOCS) for providing the proper pointing, and orbit control of said satellite.

13. The system for satellite terminal control according to claim 12, wherein said plurality of on-board subsystems and payloads comprises a propulsion subsystem connected to the COMM subsystem and AOCS.

14. The system for satellite terminal control according to claim 13, wherein said plurality of on-board subsystems and payloads comprises Data Storage Subsystem (DSS) to store all mission data.

15. The system for satellite terminal control according to claim 1, wherein said ground-based communication station comprises a telemetry and command (T&C) software application comprising computer instructions resident on a programmable computer for sending and receiving telemetry and command signals to/from said satellite using IP protocol.

16. A system for satellite terminal control, comprising:
an earth-orbiting satellite including a plurality of on-board subsystems and payloads, further including,
a communications subsystem having a programmable computer including non-transitory memory storing software resident on the programmable computer for communication using IP protocol, said communication subsystem having a unique identifier stored in its non-transitory memory, and programmed to embed its unique identifier in every outgoing communication, and a transceiver and an antenna for sending messages and receiving commands, a power subsystem having a programmable computer including non-transitory memory storing software resident on the programmable computer for supplying power to all of said plurality of on-board subsystems and payloads, said power subsystem having a unique identifier stored in its non-transitory memory, and programmed to embed its unique identifier in every outgoing communication, an Attitude and Orbit Control Subsystem (AOCS) having a programmable computer including non-transitory memory storing software resident on the programmable computer for providing the proper pointing, and orbit control of said satellite power subsystem, said AOCS subsystem having a unique identifier stored in its non-transitory memory, and programmed to embed its unique identifier in every outgoing communication;

a data storage subsystem (DSS) having a programmable computer including non-transitory memory storing software resident on the programmable computer for storing all mission data, said DSS subsystem having a unique identifier stored in its non-transitory memory, and programmed to embed its unique identifier in every outgoing communication; and a bi-directional data bus connecting all of said plurality of on-board subsystems and payloads; and a ground-based communication station comprising a programmable computer including software resident on the programmable computer for web-based telemetry, tracking, command (T&C) of said earth-orbiting satellite by communication therewith using IP protocol.

17. The system for satellite terminal control according to claim 16, wherein said unique identifiers are unique IP addresses.

18. The system for satellite terminal control according to claim 16, wherein all of said plurality of on-board subsystems and payloads each have software resident on the programmable computer for interpreting commands transmitted to said satellite from said ground station using IP protocol.

19. The system for satellite terminal control according to claim 17, wherein said software resident on the programmable computer of all of said plurality of on-board subsystems and payloads comprises a firewall module.

20. The system for satellite terminal control according to claim 16 wherein said software resident on the programmable computer of all of said plurality of on-board subsystems and payloads comprises an application server for executing applications.

21. The system for satellite terminal control according to claim 16, wherein said bi-directional data bus is hardwired.

22. The system for satellite terminal control according to claim 21, wherein said wired bi-directional data bus is one of Ethernet and universal serial bus (USB).

23. The system for satellite terminal control according to claim 16, wherein said bi-directional data bus is wireless.

24. The system for satellite terminal control according to claim 23, wherein said wireless bi-directional data bus is one of WIFI and Bluetooth.

25. A system for terminal control of a satellite comprising a ground-based communication station comprising a programmable computer including software resident on the programmable computer for web-based telemetry and command (T&C), said T&C software further comprising computer instructions for sending and receiving telemetry and command signals to/from said satellite using IP protocol.

* * * * *